United States Patent [19]

Latta

[11] 4,295,145

[45] Oct. 13, 1981

[54] ACOUSTO-OPTICALLY MODULATED LASER SCANNING ARRANGEMENT FOR CORRECTING FOR INTERFERENCE APPEARING THEREIN

[75] Inventor: Milton R. Latta, San Jose, Calif.

[73] Assignee: International Business Machines Corporation, Armonk, N.Y.

[21] Appl. No.: 974,632

[22] Filed: Dec. 29, 1978

[51] Int. Cl.³ ............................................. G01D 15/14
[52] U.S. Cl. ................................ 346/108; 350/358; 358/235
[58] Field of Search ....................... 346/108; 350/358; 358/235; 354/5

[56] References Cited

U.S. PATENT DOCUMENTS

| | | |
|---|---|---|
| 3,614,310 | 10/1971 | Korpel . |
| 3,744,039 | 7/1973 | Hrbek ............................ 350/358 X |
| 3,900,851 | 8/1975 | Bucy ............................... 346/108 X |
| 3,918,068 | 11/1975 | Reinke .................................. 354/17 |
| 3,935,566 | 1/1976 | Snopko .......................... 350/358 X |
| 4,000,493 | 12/1976 | Spaulding ....................... 346/108 X |
| 4,053,898 | 10/1977 | Hirayama ....................... 346/108 X |
| 4,054,882 | 10/1977 | Ruscitto ............................... 346/75 |

OTHER PUBLICATIONS

Rabedeau, M.. E.; Multiple Frequency A-D Deflector/Modulator; IBM Tech. Disc. Bulletin, vol. 14, No. 3, Aug. 1971, p. 926.

*Primary Examiner*—Joseph W. Hartary
*Attorney, Agent, or Firm*—George E. Roush

[57] ABSTRACT

In those high speed laser scanning systems, particularly those used in printing, employing an acousto-optical modulator driven at two or more carrier frequencies for scanning with a plurality of focussed beams simultaneously in order to reduce the required deflection scan rate and to better the rise and fall times of the waveforms, unwanted intermodulation effects arise. These undesirable intermodulation effects can be reduced or largely eliminated by increasing the difference in the carrier frequencies such that the diffracted beam spacing is increased considerably and utilizing either a scan line interlace scheme or a staggered beam scheme to maintain the required scan line spacing. In the latter case, the modulator is situated with the direction of propogation of the acousto-waves between zero and 90 degrees to the direction of image pattern scanning. The angle is made sufficiently large as to make one light beam spot in one scanning line lag a corresponding spot in the adjacent line. In a further approach the two techniques are combined.

8 Claims, 6 Drawing Figures

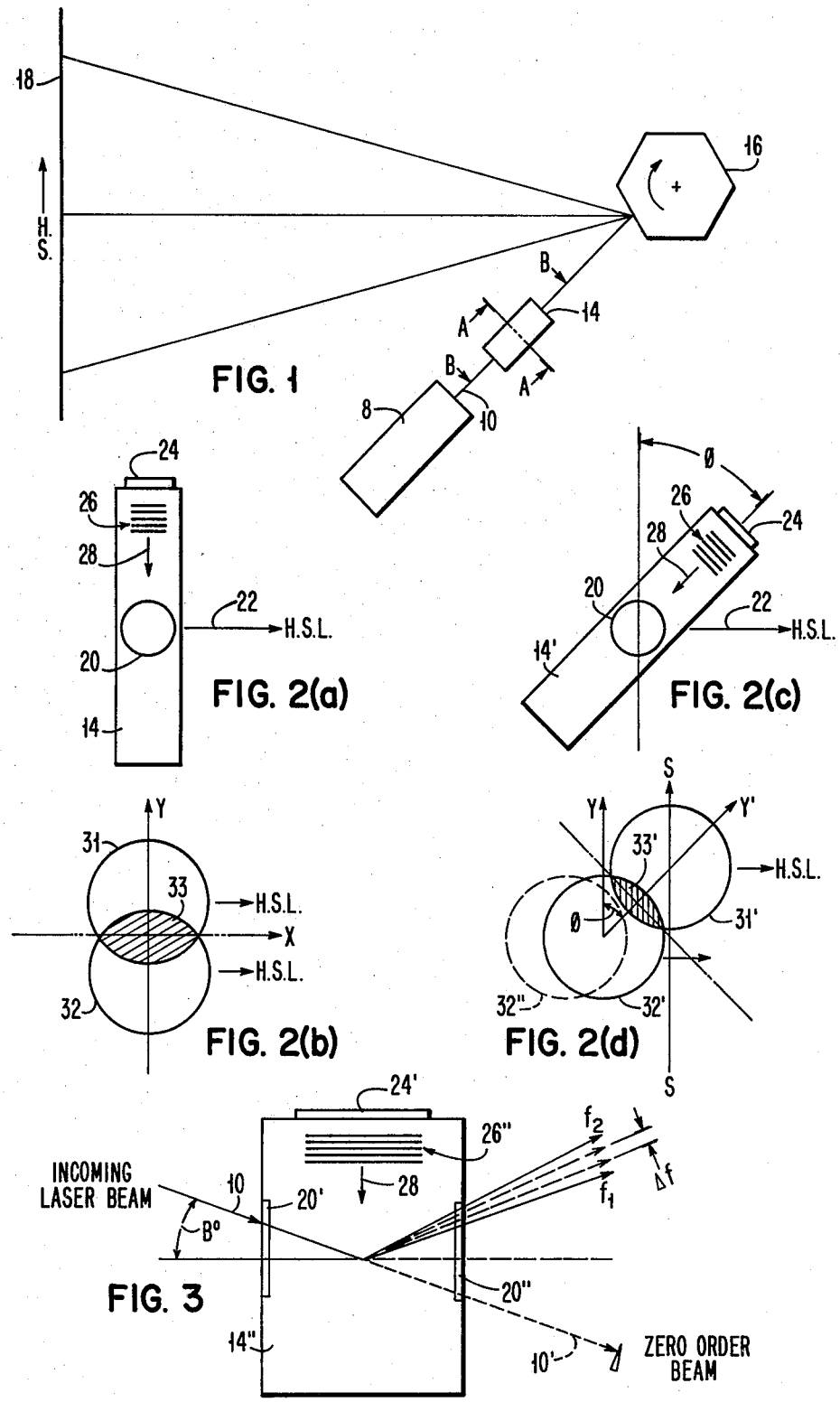

ACOUSTO-OPTICALLY MODULATED LASER SCANNING ARRANGEMENT FOR CORRECTING FOR INTERFERENCE APPEARING THEREIN

FIELD OF THE INVENTION

The invention relates to acousto-optically modulated laser scanning systems, and it particularly pertains to such systems wherein a laser beam is bistatically modulated at two or more different carrier frequencies for creating a two-dimensional spot-sequential image pattern.

BACKGROUND

Broadly acousto-optically modulated laser beam scanning systems, particularly raster scanning systems are old. Several satisfactory system arrangements are known. As the art progresses, however, the increasing demands relative to speed, resolution and registration, together with the demands on impact printing, paper toning and fusing bring about some rather difficult problems in advancing the art. Wherever possible, it is highly desirable that conventional methods and conventional apparatus be used, if for no other reason than these methods and this apparatus each has proven its worth in past performance.

Prior Art

In many very high speed laser scanning systems, particularly in those used in printing, an arrangement is known for scanning with two or more focussed beams simultaneously in order to reduce the scan rate required of the deflection apparatus and to increase the required rise and fall times of the modulation apparatus. This is sometimes accomplished with acousto-optical modulating apparatus excited at two or more carrier frequencies in order to provide the necessary individually modulatable, non-coincident beams.

In such an acousto-optically modulated raster scanning system of the type wherein a laser beam is deflected in one direction by opto-mechanical apparatus and deflected in the normal direction and intensity modulated by acousto-optical modulating apparatus operating at two or more different carrier frequencies simultaneously, any attempt to meet increased demands usually results in undesirable intermodulation products. Two novel techniques, together with corresponding novel arrangements of apparatus, will be described more completely hereinafter following a discussion of prior art systems and prior art apparatus having component apparatus and/or subsystem operation as shown and described in the prior art, particularly that represented by the disclosures in the following U.S. Pat. Nos.:

| | | | |
|---|---|---|---|
| 3,614,310 | 10/971 | Korpel | 178/6.8 |
| 3,744,039 | 7/1973 | Hrbek et al | 340/173LM |
| 3,900,851 | 8/1975 | Bucy et al | 346/49 |
| 3,935,566 | 1/1976 | Snopko | 340/173LM |
| 4,000,493 | 12/1976 | Spaulding et al | 346/1 |
| 4,053/898 | 10/1977 | Hirayama et al | 346/1 |

The patents to Korpel, to Hrbek et al and to Snopko disclose prior art acousto-optical laser beam raster scanning apparatus and systems to which the principles according to the instant invention may be applied, but which do not address the problem or suggest anything of the nature of the solution according to the invention.

The patents to Hirayama et al and to Spaulding et al disclose systems and apparatus for producing a raster scan type image display with acousto-optical laser beam scanning apparatus, but neither of them deal with the spatial overlap problem to which the apparatus according to the invention is directed and therefore do not suggest apparatus according to the invention.

SUMMARY OF THE INVENTION

The objects of the invention indirectly referred to hereinbefore and those that will appear as the specification progresses are attained in a simple system comprising a laser for generating a beam of coherent light, acousto-optical modulating apparatus arranged for receiving the laser beam and deflecting it into two or more individually modulatable beams propogating in slightly different directions, deflecting apparatus, for example a rotating mirror, arranged for receiving the modulated laser beams and deflecting them in a direction normal to the one direction, and a plane or cylindrical surface element on which the beams impinge in a sequential multiple scan pattern.

According to the invention, the area of overlap between image light spots in two adjacent scanned lines in a raster is greatly reduced, if not eliminated entirely, by one technique in accordance with the invention wherein acousto-optical modulating apparatus is rotated about the axis of the laser beam whereby the major portion of the spot on one line leads (or lags) the major portion of the spot on the succeeding line to reduce the overlap to a tolerable minimum.

In accordance with another aspect of the invention, a novel interlaced raster scan is produced by two scanning spots spaced three or more times the scan line pitch by deflecting the beams at the required angles in the acousto-optical modulator. In this manner the interference effects are avoided because there is no overlap of the dots which would deprecate the image display.

A third approach comprises a combination of the two techniques arranged in a single structural arrangement.

DRAWING

In order that full advantage of the invention obtain in practice, the best mode embodiments thereof, given by way of examples only, are described in detail hereinafter with reference to the accompanying drawing, forming a part of the specification, and in which:

FIG. 1 is a functional diagram of basic scanning apparatus to which the invention is applicable;

FIGS. 2(a), 2(b), 2(c), and FIG. 2(d) are schematic diagrams illustrating the differences in operation and structure of apparatus according to the invention over the prior art arrangement; and FIG. 3 is another schematic diagram illustrating acousto-optical modulating apparatus as employed in apparatus according to the invention.

DESCRIPTION OF BASIC APPARATUS

A basic scanning system to which the principles of the invention are applicable is shown in FIG. 1. Laser apparatus 8 is arranged to deliver a beam of coherent light through acousto-optical modulating apparatus 14 where it is modulated to a spot-sequential image bearing beam and projected onto rotating mirror apparatus 16, all of conventional construction. The rotating mirror 16 scans the beam horizontally across a cylindrical drum of radius of revolution large with respect to line plane surface 18, while vertical separation of the scanning lines over the image area is effected by lateral movement of the plane surface element or by rotation of the cylinder. Acousto-optical modulator apparatus 14 provides the two or more spots spaced the required distance for simultaneous multiple scanning of the cylindrical surface element 18. The cylindrical surface element 18 is in one application is a photo-conductive drum for a photo-printing machine and the like. It is clearly understood that the arrangement as shown has synchronizing apparatus omitted for clarity inasmuch as such in and of itself is not a part of the invention and that those skilled in the art will have the necessary means at hand for synchronizing the apparatus in known manner in at least one of many forms available.

A view of the modulating apparatus 14 taken in the direction A—A in the diagram of FIG. 1 is shown schematically in FIG. 2(a). The laser beam is projected into an optical element 20. The arrow 22 indicates the direction of the horizontal scan lines across the cylindrical surface element 18. A piezoelectrical transducer 24 responsive to two or more electric carrier frequency waves, is arranged to generate acoustic waves indicated at 26 as propogated in the direction of the arrow 28 to modulate and deflect the laser beam in the vertical direction. The waves are also modulated in intensity according to a dot-sequential signal which will recall in an optical display in accordance with conventional practice. Two or more frequencies are used so that a resulting scanning raster is effected by a plurality of scanning lines. Referring now to FIG. 2(b) there is shown schematically a pair of resulting dots or light spots 31 and 32 in adjacent scanning lines which overlap in a common area 33. In the prior art arrangements, a certain amount of such overlap must be tolerated, however, since, in order to produce continuous vertical lines, the spots must necessarily be larger than the scan line spacing. Since the laser beams that produce spots 31 and 32 are increased or decreased (depending upon the angular orientation of the laser beam relative to the acoustical wave) in frequency by the amount of the carrier frequency by which they were diffracted, the two beams interfere in the region of overlap, producing an unwanted modulation of a frequency equal to the difference in the two carrier frequencies.

DESCRIPTION OF A PREFERRED EMBODIMENT

As described hereinbefore, the apparatus and its indicated operation represents the prior art. In the overlap area 33 the two beams interfere producing intermodulation products which are undesirable. This undesirable modulation occurs at the difference frequency of $$f_3 = f_1 - f_2 \quad (1)$$

where
$f_3$ is the frequency of the intermodulation products; and $f_1$, and $f_2$ are the carrier frequencies at which the electrical transducer is driven.

The modulation depth is maximum along the horizontal scan line; it decreases from this line in both the positive and in the negative vertical directions. According to the invention the intermodulation products are greatly reduced, if not eliminated entirely, by use of an acousto-optical scanning system wherein the structure of the prior art arrangement is converted to the novel structure according to the invention in accordance with one technique by increasing the carrier frequency difference in order to increase the scanning spot spacing thereby reducing or eliminating spot overlap. The scan line spacing is maintained by rotating the modulating apparatus as shown in FIG. 2(c) over the angle $\theta$. The corresponding spot pattern is shown in FIG. 2(d). The improvement in an intermodulation effect is readily appreciated on inspection of the much smaller overlap area 33'. This overlap area is eliminated when the spots are located relative to each other as is indicated by the dashed circle 32" and the circle 31'.

This technique has several advantages which help to reduce intermodulation effects. One advantage is due to a larger separation between the beam centers, the peak amplitudes at the midpoint of the two beam centers are reduced without reduction of the contrast. The second advantage is that the effective overlap region is smaller. The third advantage resides in the fact that the spot motion is integrated along the x direction whereby the rotation angle $\theta$ produces a smoothing effect to the sinousoidal variations of intensity in the resultant exposure. Also it is an advantage that a larger separation requires a greater frequency difference between the two waveforms used to drive the electro acoustical transducer and thus the exposure variations occur over a smaller distance in the horizontal direction.

In one study with $\theta$ at angle zero degrees 33% intermodulation resulted, whereas with angle $\theta$ at 45° a maximum modulation resulting was 13%. The latter modulation depth may be below a threshold level for producing print density modulation when using an electrophotographic printing process.

This technique could be applied for a range of values of the angle $\theta$. The optimum value would be determined by the available acousto-optical modulator bandwidth available. Acousto-optical modulating apparatus as mentioned above is also capable of being used with more than two modulating frequencies.

DESCRIPTION OF AN ALTERNATE EMBODIMENT

According to the invention the basic arrangement shown in FIG. 1 is structured with the acousto-optical modulating apparatus 14 arranged in another way. A view of the modulating apparatus 14 in the direction B—B is shown schematically in FIG. 3. An incoming laser beam passes through the modulating apparatus 14" in a straight line when the piezoelectrical transducer 24' is quiescent which produces a zero order beam 10' as shown. In accordance with the invention, however, electric waves applied to the transducer 24' deflect the beam 10 at different angles for different frequencies as shown; this showing is expressed as $$f_2 = f_1 + 3\Delta f \quad (2)$$

wherein $f_1$ and $f_2$ are the chosen modulating frequencies. This wide separation of the scanning beams in the vertical direction is adapted through an interlaced scanning approach. An exemplary portion of one rather basic scanning pattern is outlined in the tables below.

TABLE I

| Scan Line | Scan Number | | | | | | |
|---|---|---|---|---|---|---|---|
| | 1 | 2 | 3 | 4 | 5 | 6 | 7 |
| 3 | | X | | | | | |
| 4 | X | | | | | | |
| 5 | | | | X | | | |
| 6 | | | X | | | | |
| 7 | | | | | | X | |

TABLE I-continued

| Scan Line | \multicolumn{7}{c}{Scan Number} |
|---|---|---|---|---|---|---|---|
| | 1 | 2 | 3 | 4 | 5 | 6 | 7 |
| 8 | | | X | | | | |
| 9 | | | | X | | | |
| 10 | | | | X | | | |
| 11 | | | | | X | | |
| 12 | | | | | X | | |
| 13 | | | | | | X | |
| 14 | | | | | | X | |
| 15 | | | | | | | X |
| 16 | | | | | | | X |

TABLE II

| Scan Number | Lines Scanned |
|---|---|
| 3 | 5,8 |
| 4 | 7,10 |
| 5 | 9,12 |
| 6 | 11,14 |
| 7 | 13,16 |
| 8 | 15,18 |

Thus, with the first scan the frequencies are set to position the beams to scan lines 1 and 4. On the next line scan 3 and 6 are scanned and so forth. The frequency difference required for this technique is three times that required if the two spots were scanning adjacent lines. However, since the spots are separated by this large amount, the spatial overlap is eliminated and thus there is no interference between the two beams.

While the invention has been described in terms of express embodiments and different arrangements suggested, it clearly should be understood that those skilled in the art will make changes as required for the application at hand without departing from the spirit and scope of the invention as defined in the appended claims concluding the specifications.

The invention claimed is:

1. An acousto-optically modulated light scanning system of the type wherein light from a laser beam is deflected in one direction by acousto-optical apparatus operating at a plurality of different frequencies and thereafter deflected in another direction by other optical apparatus for creating an image raster display in a multiple of scan lines spaced apart by a designated scan line spacing, which scanning normally would include undesirable effects of intermodulation products including spot overlap in said display, said system comprising
laser apparatus for generating a beam of coherent light, acousto-optical modulating apparatus arranged for intercepting light from said laser apparatus and for deriving at least a plurality of beams that are individually modulatable, and for independently and simultaneously modulating said derived beams to form at least a plurality of sequentially modulated beams for creating a display, and characterized by
said acousto-optically modulating apparatus being arranged for extending the angle between said individually and simultaneously modulated light beams by at least triple the angle at which said designated scan line spacing obtains on said display, and said system being arranged simultaneously for projecting at least two of said simultaneously and individually modulated light beams onto said display in coincidence with at least two scan lines spaced apart at an integral number greater than two of intervals of said designated scan line spacing whereby simultaneous spot overlap is prevented for obviating distortion that otherwise would result from said intermodulation products.

2. An acousto-optically modulated light scanning system of the type wherein light from a laser beam is deflected in one direction by acousto-optical apparatus operating at a plurality of different frequencies and thereafter deflected in a direction normal to said one direction by other optical apparatus for creating an image raster display in a multiple of scan lines spaced apart by a designated scan line spacing, which scanning normally would include undesirable effects of intermodulation products, said system comprising
laser apparatus for generating a beam of coherent light, acousto-optical modulating apparatus arranged for intercepting light from said laser apparatus and for deriving at least a plurality of beams that are individually modulatable, and for independently and simultaneously modulating said derived beams to form at least a plurality of sequentially modulated beams for creating a display, and characterized by
said acousto-optically modulating apparatus being arranged for extending the angle between said individually and simultaneously modulated light beams by at least triple the angle at which said designated scan line spacing obtains on said display, and said system being arranged for simultaneously projecting at least two of said simultaneously and individually modulated light beams onto said display in coincidence with at least two scan lines spaced apart by at least two intervals of said designated scan line spacing whereby simultaneous spot overlap is prevented for obviating distortion that otherwise would result from said intermodulation products.

3. An acousto-optically modulated light scanning system as in claim 1, and wherein
said integral number of multiples is three.

4. An acousto-optically modulated light scanning system of the type wherein light from a laser beam is deflected in one direction by acousto-optical apparatus operating at a plurality of different frequencies and thereafter deflected in another direction by other optical apparatus for creating an image raster display in a multiple of scan lines spaced apart by a designated scan line spacing, which scanning normally would include undesirable effects of intermodulation products, said system comprising
laser apparatus for generating a beam of coherent light, acousto-optical modulating apparatus arranged for intercepting light from said laser apparatus and for deriving at least a plurality of beams that are individually modulatable, and for independently and simultaneously modulating said derived beams to form at least a plurality of sequentially modulated beams for creating a display, and characterized by
said acousto-optically modulating apparatus being operated at frequencies differing by a difference frequency for extending the angle between said individually and simultaneously modulated light beams by at least triple the angle at which said designated scan line spacing obtains on said display, and said system being arranged for producing a plurality of simultaneously and individually modulated light beams spaced apart at said display at multiple intervals of said designated scan line spacing whereby at least two other scan lines of designated spacing lie between the lines formed by said independently and simultaneously modulated beams for obviating distortion that otherwise would result from said intermodulation products.

5. An acousto-optically modulated light scanning system of the type wherein light from a laser beam is deflected in one direction by acousto-optical apparatus operating at a plurality of different frequencies and thereafter deflected in a direction normal to said one direction by other optical apparatus for creating an image raster display in a multiple of scan lines spaced apart by a designated scan line spacing, which scanning normally would include undesirable effects of intermodulation products, said system comprising laser apparatus for generating a beam of coherent light, acousto-optical modulating apparatus arranged for intercepting light from said laser apparatus and for deriving at least a plurality of beams that are individually modulatable, and for independently and simultaneously modulating said derived beams to form at least a plurality of sequentially modulated beams for creating a display, and characterized by said acousto-optically modulating apparatus being arranged for extending the angle between said individually and simultaneously modulated light beams beyond the angle at which said designated scan line spacing obtains on said display, and being further arranged at an angle substantially departing from the normal to the direction of image scanning for bringing said simultaneously and individually modulated light beams into coincidence with two scan lines spaced at one interval of said designated scan line spacing whereby spot overlap is minimized for obviating distortion that otherwise would result from said intermodulation products.

6. An acousto-optically modulated light scanning system as in claim 5, and wherein said angle at which said modulating apparatus is further arranged is substantially greater than zero degrees and substantially less than ninety degrees.

7. An acousto-optically modulated light scanning system as in claim 5, and wherein said angle is substantially forty-five degrees.

8. An acousto-optically modulated light scanning system of the type wherein light from a laser beam is deflected in one direction by acousto-optical apparatus operating at a plurality of different frequencies and thereafter deflected in a direction normal to said one direction by other optical apparatus for creating an image raster display in a multiple of scan lines spaced apart by a designated scan line spacing, which scanning normally would include undesirable effects of intermodulation products, said system comprising laser apparatus for generating a beam of coherent light, acousto-optical modulating apparatus arranged for intercepting light from said laser apparatus and for deriving at least a plurality of beams that are individually modulatable, and for independently and simultaneously modulating said derived beams to form at least a plurality of sequentially modulated beams for creating a display, and characterized by said acousto-optically modulating apparatus being arranged for extending the angle between said individually and simultaneously modulated light beams beyond the angle at which said designated scan line spacing obtains on said display, and being rotated at an angle between zero and 90 degrees to the normal to the direction of image scanning created by rotating said acousto-optical modulating apparatus about an axis defined by a line midway of the plurality of beams delivered by said modulating apparatus, with said angle sufficiently large as to separate said scanning spots to maintain designated scan line spacing and to space said scanning spots sufficiently to prevent spot overlap, thereby obviating said undesirable intermodulating products, and whereby a spot on one scan line relatively leads the corresponding spot on the adjacent scan line.

* * * * *